United States Patent Office 2,997,379
Patented Aug. 22, 1961

2,997,379
METHOD FOR ELIMINATING
GROWTH OF WEEDS
Lyle D. Goodhue, Bartlesville, Okla., assignor to Phillips Petroleum Company, a corporation of Delaware
No Drawing. Filed Feb. 18, 1957, Ser. No. 640,596
17 Claims. (Cl. 71—2.3)

This invention relates to killing or controlling the growth of weeds and to compounds for doing the same. In one of its aspects, the invention relates to a method for killing weeds employing a compound as described below. In another aspect, the invention relates to herbicidal composition of matter containing at least one of said compounds as an essential active ingredient.

In a further aspect of this invention, there is provided a method for controlling the growth of foliage and weeds, especially in fields of agricultural crops and areas in which grasses which are undesired there are found by employing at the locus at which control is desired a compound as described below.

The use of chemicals to control the growth of foliage is well known in the art. Various chemicals have been used to control weeds in fields of agricultural crops, while others have been employed to selectively kill grasses which are growing on the same plot with other grasses. While many compounds are known to exhibit herbicidal activity, the development of newer and more efficient herbicides is a continuing process.

An object of this invention is to provide new and useful herbicides, said herbicides exhibiting a high degree of herbicidal activity. Another object of the invention is to provide a method of killing or controlling undesirable weeds. Other aspects, objects, as well as the several advantages of the invention are apparent from this disclosure and the claims.

According to the invention, there are used as herbicides compounds having the following structural characteristics:

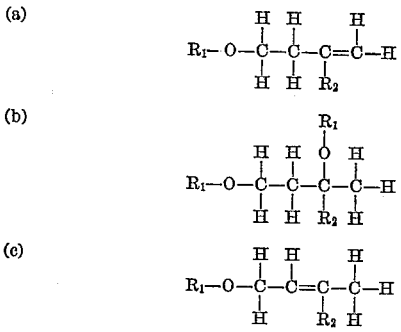

wherein $R_1$ is selected from the group consisting of hydrogen, an alkyl group containing from 1 to 10 carbon atoms, inclusive, an acyl radical, halogen-substituted acyl radical containing from 2 to 10 carbon atoms, and $R_2$ is selected from the group consisting of an aryl radical and substituted aryl radical containing from 6–10 carbon atoms; the substituents on said substituted aryl radical being selected from the group consisting of alkyl, halogen, $NO_2$, hydroxyl, alkoxy, haloalkoxy, and —$SO_3H$. As disclosed herein, halogen is intended to mean chlorine, bromine, iodine, and fluorine.

The herbicides of this invention can be used in conjunction with any suitable carrier or solvent which does not have a harmful effect on the herbicidal activities of these compounds. These herbicides are usually quite effective when applied to an area which contains the foliage to be exterminated in an amount in the range between 10 to 200 pounds per acre. The percentage of active ingredient (herbicide) in these solutions usually will be in the range of 0.1 to 5% by weight, preferably between 0.5 and 2.0 on the same basis. Suitable solvents or carriers include straight chain, branched chain and cyclic paraffinic hydrocarbons containing at least 5 carbon atoms such as n-pentane, cyclohexane, octane, and the like. A now particularly preferred solvent is HF heavy alkylate, an isoparaffinic hydrocarbon having an approximate boiling range of 260° to 800° F. prepared by alkylation of, say, isobutane with, say, butylene in presence of hydrofluoric acid, as described more fully in U.S. Patent 2,773,920, L. H. Vautrain and E. Strunk, issued December 12, 1956. This type of isoparaffinic carrier is available in the trade as Soltrol. This adjuvant carrier enhances the toxicity of the active ingredient.

A "herbicide" is used to kill or inhibit growth of weeds or undesirable plants. "Control," as applied to controlling undesirable weeds and plant foliage, means inhibition, but it can also mean killing of a plant or weed. "Kill" is defined as destroying the life of a plant or weed. Selective kill is defined as an operation used to kill growing undesirable plants in an area in which desirable plants are growing without killing the desirable plants.

The following specific examples are indicative of the herbicidal activity of the herbicides of this invention.

EXAMPLE I

Various substituted butenes and butanes were tested for pre-emergence herbicidal activity by the following procedure.

Six-inch clay flower pots were partly filled with soil, and six kinds of seeds were planted in each pot. A metal divider was used to assist in planting the seeds. The different varieties of seeds were always planted in the same order. Beans were planted first, followed by corn, radishes, rye grass, millet and cotton. The surface of the soil was then sprayed with a solution of 0.1 gram of the chemical to be tested in 10 milliliters of acetone. This corresponds to a rate of 50 pounds per acre. During the spraying, the pot was rotated on a turntable to assure an even distribution of the spray. Each of the pots was then given 250 milliliters of water by means of a perforated one-gallon tin pail. Other waterings were given from time to time as needed, and the humidity was kept as high as possible by water in the pans in which the pots were set.

After one week, the condition and number of plants in each pot was recorded. A scale was adopted in which 0 designates no growth, while 3 indicates normal growth. At the end of the second week, the plants were again checked to see if any change in the observed results had taken place. The results were then recorded, and the plants were discarded. The results of these tests are expressed below as Table I.

Table I

| Compound | Beans | Corn | Radishes | Rye Grass | Millet | Cotton |
|---|---|---|---|---|---|---|
| 2-phenyl-1-butene-4-ol [1] | 0 | 0 | 0 | 0 | 0 | 0 |
| 2-phenyl-4-acetoxy-1-butene [1] | 0 | 3 | 0 | 0 | 0 | 0 |
| 2-phenyl-4-acetoxy-2-butene | 0 | 3 | 3 | 0 | 0 | 0 |
| 2-phenyl-4-acetoxy-2-butanol | 0 | 3 | 1 | 0 | 0 | 0 |

[1] These two compounds were subsequently sprayed onto growing corn, beans, and cotton, and exhibited strong herbicidal activity. Furthermore, the herbicides exhibited hormine activity on corn, beans and cotton in that they caused a curling of the leaves of the plant.

EXAMPLE II

Various substituted butenes and butanes were tested as herbicides for Bermuda grass by the following procedure.

The compound to be tested was dissolved in HF heavy alkylate to form a solution containing 1 percent by weight of the active compound. Ten milliliters of the 1% solution was then applied to healthy plugs of Bermuda grass, each growing in 4-inch clay flower pots. This corresponds to 100 pounds per acre of the herbicide. The plugs of grass had been growing for two weeks to one month before they were sprayed. The sprayed plugs were then checked at 3 days, one week, two weeks and 3 weeks. The results of these tests are expressed below as Table II.

Table II

| Compound | Results After [1] | | | |
|---|---|---|---|---|
| | 3 Days | 1 Week | 2 Weeks | 3 Weeks |
| 2-phenyl-1-butene-4-ol | Sev | Sev | Mod | MG. |
| 2-phenyl-4-acetoxy 1-butene | Sev | Sev | Mod | MG. |
| 2-phenyl-4-acetoxy-2-butene | Mod | Sl | Sl | GG. |
| 2-phenyl-4-acetoxy-2-butanol | Sev | Sev | Mod | MG. |
| 2-phenyl-4-monochloroacetoxy-1-butene | KT | KT | KT | NG. |

[1] Legend: KT—kill tops; Sev.—severe burn; Sl.—slight growth; Mod.—moderate burn; MG—moderate growth; NG—no growth; GG—good growth.

EXAMPLE III

One of the herbicides of the present invention, 2-phenyl-1-butene-4-ol, was tested for herbicidal activity by the germinating cucumber seed test. This test was developed by the Crops Division, Camp Detrick, Maryland, and is reported in Publication 384 of the National Academy of Sciences of the National Research Council. This test is based on the inhibition of growth of the primary root of germinating cucumber seeds. In this test, 25 cucumber seeds of the Early Fortune variety are placed on filter paper in a Petri dish and 15 milliliters of a very dilute solution of the compound to be tested in water and acetone is added to the dish. The dishes are then covered and incubated in the dark for 96 hours at 28° C., at which time the length of the primary roots are measured in millimeters. Each test was run in triplicate. A check run was made in which no herbicide was applied to the seeds, and a comparison run was also made in which a commercial herbicide was employed. The results of these runs are given below in Table III.

Specific compounds falling within the several groups (a), (b) and (c) above given by structural formula are:

(a) 2-phenyl-4-methoxy-1-butene
2-(2,4-diethylphenyl)-4-decoxy-1-butene
2-(2-hydroxyphenyl)-4-tert-butoxy-1-butene
2-(4-chlorophenyl)-4-isopropoxy-1-butene
2-phenyl-4-acetoxy-1-butene
2-(2,3-dimethyl-6-acetoxyphenyl)-4-caproxy-1-butene
2-(2,4-dichlorophenyl)-1-butene-4-ol (b) 2-phenyl-2,4-dimethoxybutane
2-(2-sulfo-4-tert-butylphenyl)-2-hydroxy-4-acetoxybutane
2-p-tolyl-2-methoxy-4-acetoxybutane
2-(3-hydroxyphenyl)-2,4-dihydroxybutane
2-(3-chloro-4-chloromethoxyphenyl)-2-hydroxy-4-decoxybutane
2-phenyl-2-caproxy-4-chloroacetoxybutane
2-(2-nitro-4-tert-butylphenyl)-2,4-didecoxybutane
2-phenyl-2-hydroxy-4-acetoxybutane (c) 2-phenyl-4-hydroxy-2-butene
2-phenyl-4-acetoxy-2-butene
2-(2-chloroacetoxyphenyl)-4-caproxy-2-butene
2-(2,4-diethylphenyl)-4-methoxy-2-butene
2-(3-sulfophenyl)-4-tert-butoxy-2-butene
2-(2,4,6-trichlorophenyl)-4-decoxy-2-butene
2-phenyl-4-(2-chlorocaproxy)-2-butene Reasonable variation and modification are possible within the scope of the foregoing disclosure and the appended claims to the invention, the essence of which is that the above-defined compounds or compounds having the foregoing defined structural characteristics have been found to be worthwhile herbicidal composition ingredients and that methods for using the same have been described.

I claim:

1. A method for eliminating growth of weeds which comprises applying to the locus at which such control is desired, an effective amount of 2-phenyl-1-butene-4-ol.

2. A method for eliminating growth of weeds which comprises applying to the locus at which such control is desired, an effective amount of 2-phenyl-4-monochloroacetoxy-1-butene.

3. A method for eliminating growth of weeds which comprises applying to the locus at which such control is desired, an effective amount of 2-phenyl-4-methoxy-1-butene.

4. A method for eliminating growth of weeds which comprises applying to the locus at which such control is desired, an effective amount of 2-(2,4-diethylphenyl)-4-decoxy-1-butene.

5. A method for eliminating growth of weeds which comprises applying to the locus at which such control is desired, an effective amount of 2-(2-hydroxyphenyl)-4-tert-butoxy-1-butene.

6. A method for eliminating growth of weeds which comprises applying to the locus at which such control is Table III

| Compound | Concentration,[2] p.p.m. | Millimeters Root Growth | | | Total mm. Root Growth | Avg. mm. Root Growth | Percent of Normal Growth |
|---|---|---|---|---|---|---|---|
| | | Dish 1 | Dish 2 | Dish 3 | | | |
| 2-phenyl-1-butene-4-ol | 0.1 | 466 | 849 | 260 | 1,575 | 21.00 | 48 |
| 2-phenyl-1-butene-4-ol | 1.0 | 319 | 338 | 287 | 944 | 12.59 | 29 |
| 2-phenyl-1-butene-4-ol | 10.0 | 117 | 103 | 119 | 339 | 4.52 | 10 |
| Commercial herbicide [1] | 1.0 | 206 | 162 | 210 | 578 | 7.71 | 18 |
| Control (Normal Growth) | 0 | 899 | 1,131 | 1,233 | 3,263 | 43.51 | |

[1] Commercial herbicide sold under the trade name of Esteron 10-10, and containing a 2,4-di or 2,4,5-trichlorophenoxyacetic acid compound.
[2] The solutions were made by dissolving the compound in acetone to form a 1% (by wt.) solution, and this solution was then diluted with water until the desired concentration was reached.

It will be noted that selected members of the groups of herbicides disclosed herein can be applied to sterilize soils for certain periods of time as is sometimes useful in the construction industry. Also, control of seeds of undesired plants can be effected by sterilizing the soil at their best germination time with a sterilizing quantity of compound which will leach away by the time desired seeds are to be planted or germinated.

desired, an effective amount of 2-(4-chlorophenyl)-4-isopropoxy-1-butene.

7. A method for eliminating growth of weeds which comprises applying to the locus at which such control is desired, an effective amount of 2-phenyl-4-acetoxy-1-butene.

8. A method for eliminating growth of weeds which comprises applying to the locus at which such control is desired, an effective amount of 2-(2,3-dimethyl-6-acetoxyphenyl)-4-caproxy-1-butene.

9. A method for eliminating growth of weeds which comprises applying to the locus at which such control is desired, an effective amount of 2-(2,4-dichlorophenyl)-1-butene-4-ol.

10. A method for eliminating growth of weeds which comprises applying to the locus at which such control is desired, an effective amount of 2-phenyl-4-hydroxy-2-butene.

11. A method for eliminating growth of weeds which comprises applying to the locus at which such control is desired, an effective amount of 2-phenyl-4-acetoxy-2-butene.

12. A method for eliminating growth of weeds which comprises applying to the locus at which such control is desired, an effective amount of 2-(2-chloroacetoxyphenyl)-4-caproxy-2-butene.

13. A method for eliminating growth of weeds which comprises applying to the locus at which such control is desired, an effective amount of 2-(2,4-diethylphenyl)-4-methoxy-2-butene.

14. A method for eliminating growth of weeds which comprises applying to the locus at which such control is desired, an effective amount of 2-(3-sulfophenyl)-4-tert-butoxy-2-butene.

15. A method for eliminating growth of weeds which comprises applying to the locus at which such control is desired, an effective amount of 2-(2,4,6-trichlorophenyl)-4-decoxy-2-butene.

16. A method for eliminating growth of weeds which comprises applying to the locus at which such control is desired, an effective amount of 2-phenyl-4-(2-chlorocaproxy)-2-butene.

17. A method for eliminating growth of weeds which comprises applying to the locus at which such control is desired, an effective amount of a compound selected from the group consisting of 2-phenyl-1-butene-4-ol, 2-phenyl-4-monochloroacetoxy-1-butene, 2-phenyl-4-methoxy-1-butene, 2-(2,4-diethylphenyl)-4-decoxy-1-butene, 2-(2-hydroxyphenyl)-4-tert-butoxy-1-butene, 2-(4-chlorophenyl)-4-isopropoxy-1-butene, 2-phenyl-4-acetoxy-1-butene, 2-(2,3-dimethyl-6-acetoxyphenyl)-4-caproxy-1-butene, 2-(2,4-dichlorophenyl)-1-butene-4-ol, 2-phenyl-4-hydroxy-2-butene, 2-phenyl-4-acetoxy-2-butene, 2-(2-chloroacetoxyphenyl)-4-caproxy-2-butene, 2-(2,4-diethylphenyl)-4-methoxy-2-butene, 2-(3-sulfophenyl)-4-tert-butoxy-2-butene, 2-(2,4,6-trichlorophenyl)-4-decoxy-2-butene, and 2-phenyl-4-(2-chlorocaproxy)-2-butene.

References Cited in the file of this patent

UNITED STATES PATENTS

| | | |
|---|---|---|
| 2,335,384 | Bousquet et al. | Nov. 30, 1943 |
| 2,392,859 | Meuli | Jan. 15, 1946 |
| 2,554,947 | Joos | May 29, 1951 |
| 2,575,282 | McKay | Nov. 13, 1951 |
| 2,587,566 | Buc | Feb. 26, 1952 |
| 2,704,246 | Goodhue et al. | Mar. 15, 1955 |
| 2,744,817 | Toornman | May 8, 1956 |
| 2,768,212 | Copenhaver | Oct. 23, 1956 |
| 2,834,747 | Short et al. | May 13, 1958 |
| 2,840,598 | Schwartz | June 24, 1958 |

OTHER REFERENCES

King: U.S. Dept. of Agriculture Handbook, No. 69, May 1954, page 92.

Thompson et al.: "Botanical Gazette," vol. 107, pages 475–507, 1946.